United States Patent
Wang et al.

(10) Patent No.: US 9,563,092 B2
(45) Date of Patent: Feb. 7, 2017

(54) LIQUID CRYSTAL DISPLAY PANEL AND FAN-OUT AREA THEREOF

(71) Applicant: Shenzhen China Star Optoelectronics Technology Co., Ltd., Shenzhen, Guangdong (CN)

(72) Inventors: Cong Wang, Guangdong (CN); Peng Du, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 344 days.

(21) Appl. No.: 14/384,157

(22) PCT Filed: Sep. 3, 2014

(86) PCT No.: PCT/CN2014/085852
§ 371 (c)(1),
(2) Date: Sep. 9, 2014

(87) PCT Pub. No.: WO2016/029500
PCT Pub. Date: Mar. 3, 2016

(65) Prior Publication Data
US 2016/0238868 A1    Aug. 18, 2016

(30) Foreign Application Priority Data
Aug. 27, 2014  (CN) .......................... 2014 1 0429512

(51) Int. Cl.
*G02F 1/1345* (2006.01)
(52) U.S. Cl.
CPC .................. *G02F 1/1345* (2013.01)
(58) Field of Classification Search
CPC ............... G02F 1/1345; G02F 1/13452; G02F 1/134309; G02F 1/13306; G02F 1/133; G02F 1/0102; G02F 1/13454; G02F 1/136204; G02F 2201/122; H01L 27/3276; G06F 1/16; G06F 3/047; G09G 2300/0426; G09G 3/3648; H05K 1/0296; H05K 1/11; H05K 1/0213; H05K 7/02
USPC ..... 349/149, 139, 152, 54, 151, 40, 150, 92; 345/87, 204, 205
See application file for complete search history.

(56) References Cited

U.S. PATENT DOCUMENTS

2008/0049156 A1* 2/2008 Kim .................. G02F 1/136286
                                                         349/40
2010/0225624 A1* 9/2010 Fu ............................ G09G 3/20
                                                         345/205
2010/0283955 A1* 11/2010 Kim ...................... G02F 1/1345
                                                         349/149

* cited by examiner

*Primary Examiner* — Thoi Duong
(74) *Attorney, Agent, or Firm* — Andrew C. Cheng

(57) ABSTRACT

A liquid crystal display panel and a fan-out area thereof are provided. The fan-out area is arranged in a peripheral circuit area of the liquid crystal display panel and includes a middle wire and multiple fan-out wires arranged at two sides thereof. The middle wire and the fan-out wires each are disposed with at least one first wire pattern. Along each of directions toward the middle wire, widths of the first wire patterns of different wires are successively increased and/or lengths of the first wire patterns are successively decreased. The first wire patterns of a same wire have same width and length. Accordingly, the present invention can reduce the resistance differences among the wires in the fan-out area, color washout and non-uniform brightness caused by the resistance differences can be relieved or avoided, and is beneficial to the narrow border design of the liquid crystal display panel.

9 Claims, 3 Drawing Sheets

LIQUID CRYSTAL DISPLAY PANEL AND FAN-OUT AREA THEREOF

TECHNICAL FIELD

The present invention relates to the field of liquid crystal display technology, especially the field of wire routing technology in a peripheral circuit area of a liquid crystal display panel, and particularly to a liquid crystal display panel and a wire layout of a fan-out area thereof, so as to reduce resistance differences in the fan-out area.

DESCRIPTION OF RELATED ART

A liquid crystal display panel generally includes a display area and a peripheral circuit area. The display area has pixel units formed therein for image display. The peripheral circuit area has driver ICs and wires such as scan lines and data lines connected to the driver ICs formed therein. In order to decrease the peripheral circuit area and increase the display area, the wires generally are designed toward the driver ICs and thereby forming fan-out areas.

In the fan-out area, the wires arranged at different positions with respect to the driver ICs would result in the wires having different lengths. Generally speaking, a middle wire in the fan-out area has the shortest length, and other wires arranged at two sides of the middle wire have relatively longer lengths. The length differences would result in the wires having resistance differences (Rmax−Rmin) thereamong, and the larger the length difference, the lager the resistance difference. Especially for the liquid crystal display panel with the design of high pin count, since only has one driver IC and one fan-out area, length differences among the wires are very large, which result in the resistance differences among the wires also being large. During displaying, the larger the resistance differences, the phenomenon of color washout and non-uniform brightness occurred in the display image is more serious, resulting in worse display effect.

SUMMARY

Accordingly, a technical problem will be solved by embodiments of the present invention is to provide a liquid crystal display panel and a fan-out area thereof, so as to reduce resistance differences among wires in the fan-out area and thereby relieve or avoid the phenomenon of color washout and non-uniform brightness caused by the resistance differences.

In order to solve the above technical problem, a technical solution proposed by the present invention is to provide a fan-out area. The fan-out area is adapted for being arranged in a peripheral circuit area of a liquid crystal display panel. The fan-out area includes a plurality of wires. The plurality of wires include a middle wire and a plurality of fan-out wires arranged at two sides of the middle wire. The middle wire and the plurality of fan-out wires each are disposed with at least one first wire pattern. Along each of directions toward the middle wire, widths of the first wire patterns of different wires of the plurality of wires are successively increased and/or lengths of the first wire patterns of the different wires of the plurality of wires are successively decreased. The first wire patterns of a same one of the plurality of wires have a same width and a same length. Any two neighboring wires of the plurality of wires have a distance same as that of another two neighboring wires of the plurality of wires. The plurality of fan-out wires are symmetrically arranged at the two sides of the middle wire. The first wire pattern includes first sub-patterns and a second sub-pattern, the first sub-patterns and the second sub-pattern being alternately perpendicularly connected with one another in head-to-tail manner, a length of each the first sub-pattern being the width of the first wire pattern, and a length of the second sub-pattern being the length of the first wire pattern.

In an exemplary embodiment, along each of the directions toward the middle wire, the lengths of the first sub-patterns of the different wires are successively increased, and the lengths of the second sub-patterns of the different wires are the same.

In an exemplary embodiment, along each of the directions toward the middle wire, the lengths of the second sub-patterns of the different wires are successively decreased, and the lengths of the first sub-patterns of the different wires are the same.

In an exemplary embodiment, along each of the directions toward the middle wire, the lengths of the first sub-patterns of the different wires are successively increased, and the lengths of the second sub-patterns of the different wires are successively decreased.

In an exemplary embodiment, the fan-out area further includes turning parts and second wire patterns. Each of the turning parts connects corresponding first wire pattern and corresponding second wire pattern. Connection points of the turning parts and the second wire patterns at each side of the middle wire are on a same imaginary straight line.

In order to solve the above technical problem, another technical solution proposed by the present invention is to provide a fan-out area. The fan-out area is adapted for being arranged in a peripheral circuit area of a liquid crystal display panel. The fan-out area includes a plurality of wires. The plurality of wires include a middle wire and a plurality of fan-out wires arranged at two sides of the middle wire. The middle wire and the plurality of fan-out wires each are disposed with at least one first wire pattern. Along each of directions toward the middle wire, widths of the first wire patterns of different wires of the plurality of wires are successively increased and/or lengths of the first wire patterns of the different wires of the plurality of wires are successively decreased. The first wire patterns of a same one of the plurality of wires have a same width and a same length.

In an exemplary embodiment, the first wire pattern includes first sub-patterns and a second sub-pattern. The first sub-patterns and the second sub-pattern are alternately perpendicularly connected with one another in head-to-tail manner, a length of each the first sub-pattern being the width of the first wire pattern, and a length of the second sub-pattern being the length of the first wire pattern.

In an exemplary embodiment, along each of the directions toward the middle wire, the lengths of the first sub-patterns of the different wires are successively increased, and the lengths of the second sub-patterns of the different wires are the same.

In an exemplary embodiment, along each of the directions toward the middle wire, the lengths of the second sub-patterns of the different wires are successively decreased, and the lengths of the first sub-patterns of the different wires are the same.

In an exemplary embodiment, along each of the directions toward the middle wire, the lengths of the first sub-patterns of the different wires are successively increased, and the lengths of the second sub-patterns of the different wires are successively decreased.

In an exemplary embodiment, the fan-out area further includes turning parts and second wire patterns. Each of the turning parts connects corresponding first wire pattern and corresponding second wire pattern. Connection points of the turning parts and the second wire patterns at each side of the middle wire are on a same imaginary straight line.

In an exemplary embodiment, widths of the first sub-patterns and widths of the second sub-patterns of the middle wire and the plurality of fan-out wire are the same, and further are the same as widths of the second wire patterns.

In an exemplary embodiment, any two neighboring wires of the plurality of wires have a same distance, i.e., any two neighboring wires have a distance same as that of another two neighboring wires.

In order to solve the technical problem, still another technical solution proposed by the present invention is to provide a liquid crystal display panel. A peripheral circuit area of the liquid crystal display panel has the above fan-out area.

In an exemplary embodiment, the first wire pattern includes first sub-patterns and a second sub-pattern. The first sub-patterns and the second sub-pattern are alternately perpendicularly connected with one another in head-to-tail manner, a length of each the first sub-pattern being the width of the first wire pattern, and a length of the second sub-pattern being the length of the first wire pattern.

In an exemplary embodiment, along each of directions toward the middle wire, the lengths of the first sub-patterns of the different wires are successively increased, and the lengths of the second sub-patterns of the different wires are the same.

In an exemplary embodiment, along each of the directions toward the middle wire, the lengths of the second sub-patterns of the different wires are successively decreased, and the lengths of the first sub-patterns of the different wires are the same.

In an exemplary embodiment, along each of the directions toward the middle wire, the lengths of the first sub-patterns of the different wires are successively increased, and the lengths of the second sub-patterns of the different wires are successively decreased.

In an exemplary embodiment, the fan-out area of the liquid crystal display panel further includes turning parts and second wire patterns. Each of the turning parts connects corresponding first wire pattern with corresponding second wire pattern. Connection points of the turning parts and the second wire patterns at each side of the middle wire are on a same imaginary straight line.

By the above technical solutions, beneficial effects can be achieved by the present invention are that: the embodiments of the present invention design the first wire patterns of different wires in the fan-out area to be with successively increased widths and/or successively decreased lengths along each of the directions toward the middle wire while the first wire patterns of a same wire to be with a same width and a same length, so as to reduce the length differences among the wires in the fan-out area, the resistance differences among the wires can be reduced, and thereby the phenomenon of color washout and non-uniform brightness caused by the resistance differences can be relieved or avoided. Moreover, the decrease of the length differences among the wires in the fan-out area can reduce the area of the fan-out area with respect to the prior art, which is beneficial to the narrow border design of liquid crystal display panel.

In order to further understand the features and technical contents of the present invention, please refer to the following detailed description and accompanying drawings of the present invention. However, the drawings are provided for the purpose of illustration and description only, and are not intended to limit the present invention.

BRIEF DESCRIPTION OF THE DRAWINGS

Embodiments of the present invention will be described below in detail with reference to the drawings, and thereby the technical solutions of the present invention and other beneficial effects will be more apparent. In the drawings.

DETAILED DESCRIPTION OF EMBODIMENTS

In the following, with reference to accompanying drawings of embodiments of the present invention, technical solutions in the embodiments of the present invention will be clearly and completely described. Apparently, the embodiments of the present invention described below only are a part of embodiments of the present invention, but not all embodiments. Based on the described embodiments of the present invention, all other embodiments obtained by ordinary skill in the art without creative effort belong to the scope of protection of the present invention.

According to the common knowledge in the prior art that the larger of length differences among wires in a fan-out area, the larger the resistance differences are, if wanting to reduce the resistance differences, it is necessary to decrease the length differences among the wires. By combining three neighboring wires in a fan-out area of prior art as shown in FIG. 1, a relationship of length difference between two neighboring wires will be described below firstly.

Figure 1:
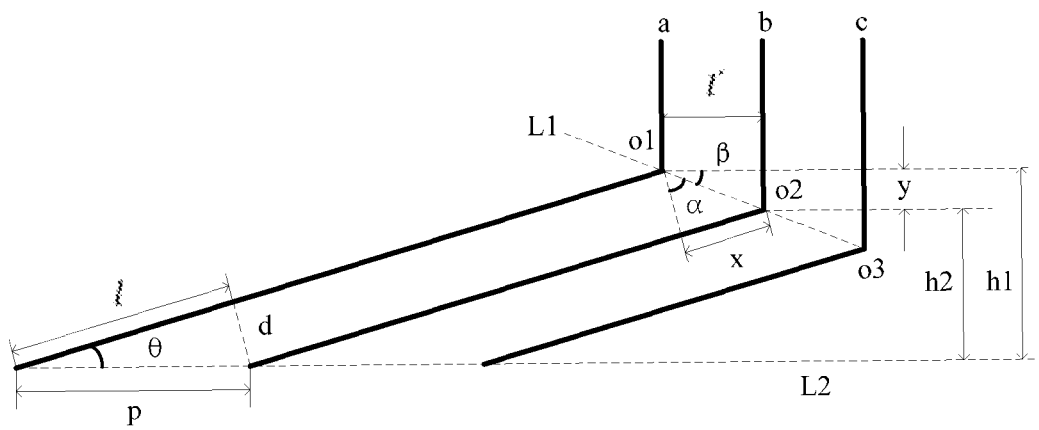
FIG. 1 is a schematic partial structural view of three neighboring wires in the prior art.

Referring to FIG. 1, the three wires a, b, c in the fan-out area are arranged neighboring with one another and respectively have turning points o1, o2, o3. The turning points o1, o2, o3 of the three wires a, b, c are on a dashed straight line L1. Ends of the wires a, b, c near a display area of a liquid crystal display panel intersect another dashed straight line L2 with three points respectively, and the dashed straight line L2 is in parallel with an edge of the display area in a rectangular shape.

Where, d is a vertical distance between the wire a and the wire b, θ is an angle between each of the wires a, b, c and the dashed straight line L2, l and p respectively are the long right-angle side and the oblique side of a right triangle using the θ as a vertex and the intersection point between the wire b and the dashed straight line L2 as an apex angle, l' is a distance between ends of the wires a, b facing away from the dashed straight line L1 as well as the intersection point of along the direction of the dashed straight line L2, α is an angle between the dashed straight line L1 and the straight line on which the d is located, β is an angle between the dashed straight line L1 and the dashed straight line L2, x is a distance between the turning point o1 and the turning point o2 along a direction on which the l is located, y is a distance between the turning point o1 and the turning point o2 along a direction perpendicular to the dashed straight line L2, $h_1$ is a distance between the turning point o1 and the dashed straight line L2 along a direction perpendicular to the dashed straight line L2, $h_2$ is a distance between the turning point o2 and the dashed straight line L2 along the direction perpendicular to the dashed straight line L2. Accordingly, eight expressions will be obtained as follows.

$$l' = p\cos\theta \qquad \text{(Expression 1-1)}$$

$$d = p\sin\theta \qquad \text{(Expression 1-2)}$$

$$\tan\alpha = \frac{x}{d} \qquad \text{(Expression 1-3)}$$

$$\tan\beta = \frac{y}{l'} \qquad \text{(Expression 1-4)}$$

$$\theta = \frac{\pi}{2} - \alpha - \beta \qquad \text{(Expression 1-5)}$$

$$\tan\theta = \frac{h_1}{s_1} = \frac{h_2}{s_2} \qquad \text{(Expression 1-6)}$$

$$s_1 - s_2 = p - l' \qquad \text{(Expression 1-7)}$$

$$h_1 - h_2 = y \qquad \text{(Expression 1-8)}$$

Based on the eight expressions, a length difference between the wire a and the wire b can be obtained as:

$$\Delta L_1 = l - x - y = \frac{(p - l')}{\cos\theta}(\cos 2\theta - \sin\theta) \qquad \text{(Expression 1-9)}$$

Likewise, a length difference between the wire b and the wire c can be obtained as:

$$\Delta L_2 = l - x - y = \frac{(p - l')}{\cos\theta}(\cos 2\theta - \sin\theta) \qquad \text{(Expression 1-10)}$$

Analogously, a length difference between the (n−1)th wire and the nth wire can be obtained as:

$$\Delta L_n = \frac{n(p - l')}{\cos\theta}(\cos 2\theta - \sin\theta) \qquad \text{(Expression 1-11)}$$

Figure 2:
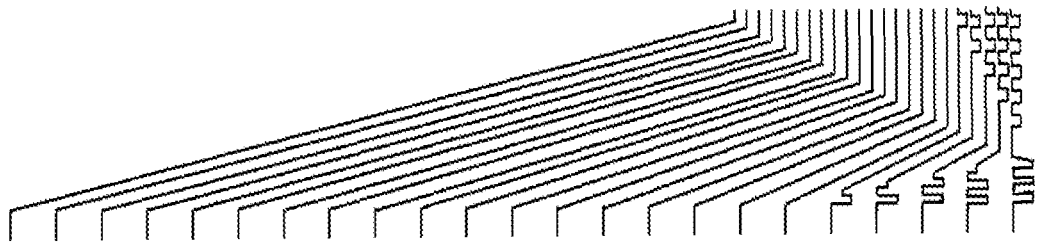
FIG. 2 is a schematic partial structural view of a fan-out area in the prior art.

Referring to FIG. 2, in order to reduce the resistance differences among the wires, the wires in the industry are designed with arcuate patterns, by setting the amount/number of the arcuate patterns of each wire, the length differences among the wires in the fan-out area are decreased until to be zero.

Figure 3:
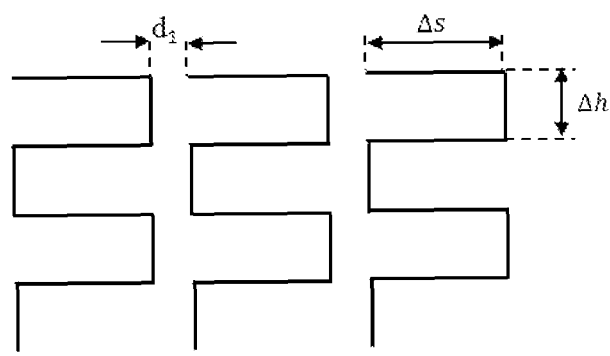
FIG. 3 is a schematic structural view of arcuate patterns of three neighboring wires in FIG. 2.

Referring to FIG. 3, arcuate patterns of wires such as nth, (n−1)th and (n−2)th wires in the conventional fan-out area have a same width Δs and a same length Δh. In order to reduce the resistance differences, the width Δs and the length Δh of the arcuate patterns must satisfy the following expression 1-12:

$$n \cdot \Delta s = \frac{(p - l')}{\cos\theta}(\cos 2\theta - \sin\theta) \qquad \text{(Expression 1-12)}$$

Where, n is a positive integer.

When the resistance differences among the wires in the conventional fan-out area are minimum, the width Δs and the length Δh of the arcuate patterns ought to satisfy the following expressions:

$$\Delta s = l' - d_{1'} \qquad \text{(Expression 1-13)}$$

$$\frac{\Delta L_n}{\Delta s} = N \qquad \text{(Expression 1-14)}$$

$$N\Delta h \leq h_1 \qquad \text{(Expression 1-15)}$$

$$\Delta h \geq d_1 > 0 \qquad \text{(Expression 1-16)}$$

Where, N is a maximum positive integer solution satisfying the above expressions, and $d_1 > 0$.

Due to the widths Δs as well as lengths Δh of the arcuate patterns of the wires being the same and a height limit of the fan-out area on a direction perpendicular to an edge of the display area, a value of $h_1$ is limited, so that it is difficult to get a solution of N satisfying all the expressions 1-12 through 1-16. That is, it is difficult to decrease even eliminate the length differences among the wires in the situation of the wires having arcuate patterns with a same width and a same length, and thus the wires in the conventional fan-out area still have large resistance differences existed thereamong.

Accordingly, an objective of the present invention is to design the structure of an arcuate pattern of each wire and re-arrange wires of a fan-out area, so as to reduce the resistance differences.

Figure 4:
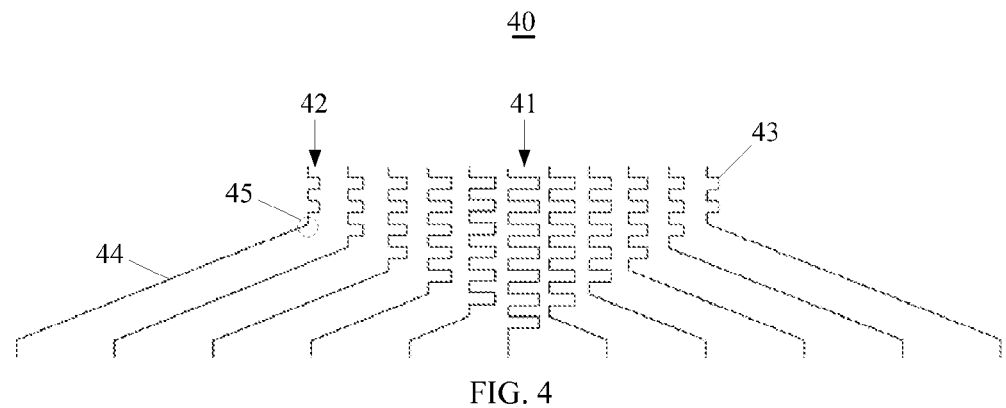
FIG. 4 is a schematic structural top view of a fan-out area of a first embodiment of the present invention.
Figure 5:
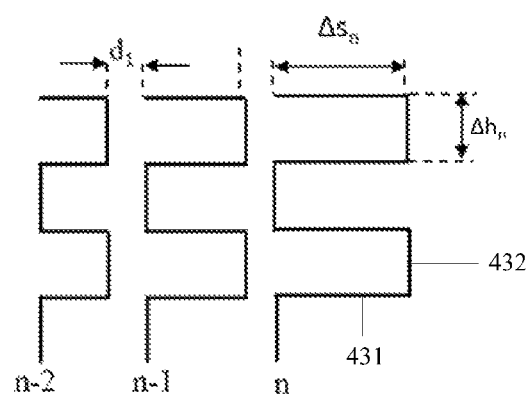
FIG. 5 is a schematic partial structural view of three neighboring wires in FIG. 4.

FIG. 4 is a schematic structural top view of a fan-out area according to a first embodiment of the present invention, and FIG. 5 is a schematic partial structural view of three neighboring wires. Please refer to FIGS. 4 and 5 together:

The fan-out area 40 includes a plurality of wires. The wires are classified into a middle wire 41 arranged at a middle region of the fan-out area 40 and a plurality of fan-out wires 42 arranged at two sides of the middle wire 41. In the illustrated embodiment, the fan-out wires 42 are symmetrically arranged at the two sides of the middle wire 41, and any two neighboring wires of the wires have a distance $d_1$ same as that of another two neighboring wires of the wires.

The middle wire 41 and the fan-out wires 42 each are disposed with at least one first wire pattern 43. Moreover, along each of directions toward the middle wire 41, widths of the first wire patterns 43 of different wires (including the middle wire 41 and the fan-out wires 42) are successively increased. In the illustrated embodiment, the widths of the first wire patterns 43 of the different wires are successively increased with a same first amplitude.

It is noted that, widths as well as lengths of the first wire patterns 43 in a same wire are the same. In other words, along each of the directions toward the middle wire 41, the width as well as the length of the first wire patterns 43 of a same wire are kept unchanged.

In addition, each wire in the fan-out area 40 further includes a second wire pattern 44 and a turning part 45. The turning part 45 connects the first wire pattern(s) 43 with the second wire pattern 44. Connection points of the turning parts 45 and the second wire patterns 44 at each side of the middle wire 41 are on a same imaginary straight line. As seen from FIG. 4, the connection points at two sides of the middle wire 41 are on two intersected imaginary straight lines.

Accordingly, by changing the widths and/or lengths of the first wire patterns 43 of the wires, length differences among the wires can be the same, the length differences among the wires in the fan-out area 40 can be reduced and the resistance differences can be reduced consequently. Detail description will be made below.

The first wire pattern 43 includes first sub-patterns 431 and a second sub-pattern 432. The first sub-patterns 431 and the second sub-pattern 432 are alternately perpendicularly connected with one another in head-to-tail manner to thereby constitute a pattern similar to the arcuate pattern in the prior art as described above. The widths of the first sub-patterns 431 are the same as that of the second patterns 432 of the middle wire 41 and the fan-out wires 42, and further are the same as the widths of the second wire patterns 44. Furthermore, in each wire, a length of each the first sub-pattern 431 is the width of the first wire pattern 43, a length of the second sub-pattern 432 is the length of the first wire pattern 43. For example, the length of each the first sub-pattern 431 of a nth wire is the width of the first wire pattern 43 of the nth wire, the length $\Delta h_n$ of the second pattern 432 of the nth wire is the length of the first wire pattern 43 of the nth wire.

Along each of the directions toward the middle wire 41, the lengths of the first sub-patterns 431 of different wires are successively increased with a same amplitude, and the lengths of the second sub-patterns 432 of the different wires are the same, i.e., $\Delta h_n$. By further combining the expressions 1-13 through 1-16 ought to be satisfied by the width $\Delta s$ and length $\Delta h$ of the arcuate pattern in prior art as described above with the route (rather than length) of the second wire pattern 44 and the turning part 45 of each wire in the fan-out area according to the first embodiment being same as that of the prior art, it can be obtained that, in each wire, the length of each the first sub-pattern 431 and the length of each the second sub-pattern 432 ought to satisfy the following expressions:

$$0 \le \Delta s_1 < \Delta s_2 \ldots < \Delta s_n \le l' - d_1 \quad \text{(Expression 1-17)}$$

$$\frac{\Delta L_n}{\Delta s_n} = N \quad \text{(Expression 1-18)}$$

$$N\Delta h \le h_1 \quad \text{(Expression 1-19)}$$

Where, $\Delta s_1, \Delta s_2, \ldots, \Delta s_n$ respectively are the widths of the first wire patterns 43 of the first wire, the second wire, ..., the nth wire in the fan-out area 40; $d_1$ is a distance between two neighboring wires in the fan-out area 40, i.e., a distance between the first wire patterns 43 of two neighboring wires; since $\Delta h_n$ has a value same as that of $\Delta h$, the $\Delta h$ in the expression 1-19 is the $\Delta h_n$.

Compared with the prior art, in the first embodiment, the positions of the whole fan-out area 40 and the display area of the liquid crystal display panel are kept unchanged while the widths $\Delta s$ of arcuate patterns of the wires are successively increased, so that the width $\Delta s$ of the arcuate patterns corresponding to the wire with a minimum resistance (middle wire 41) is maximum. In addition, by designing the widths $\Delta s$ of the arcuate patterns of the wires to be successively increased, compared with the prior art with unchanged width of arcuate pattern, the first embodiment more easily satisfies all the above expressions 1-17 through 1-19 to get the solution of N. That is, the scheme of the arcuate patterns of the wires having successively increased widths and unchanged length is easily to reduce even eliminate the length differences among the wires, and thereby the resistance differences among the wires in the fan-out area 40 can be reduced.

Further, as to each wire, the first embodiment can reduce its length while successively increases the widths of the arcuate patterns of different wires, i.e., the length along a direction perpendicular to the display area would be reduced with respect to the prior art, which is extremely beneficial to the narrow border design of the liquid crystal display panel.

Figure 6:
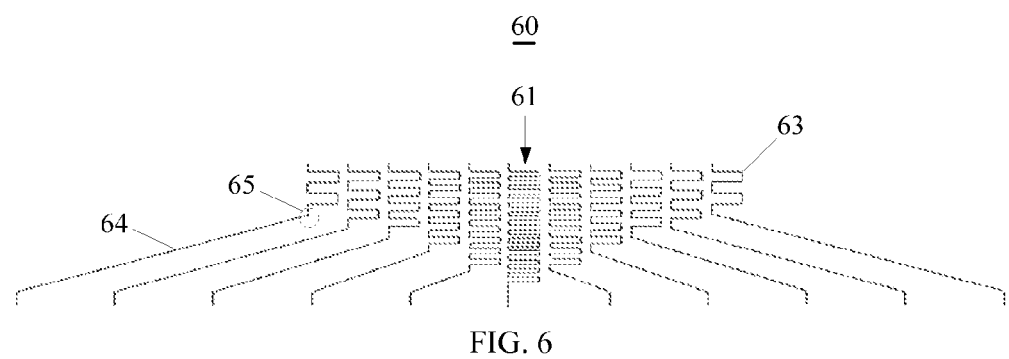
FIG. 6 is a schematic structural top view of a fan-out area of a second embodiment of the present invention.
Figure 7:
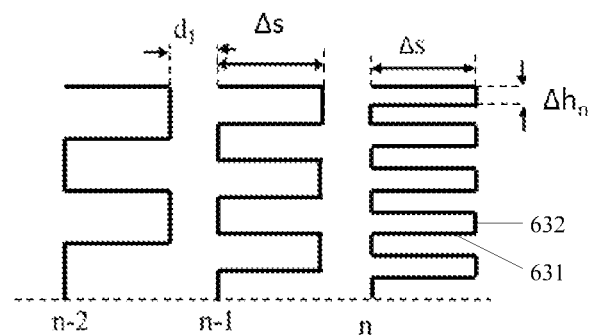
FIG. 7 is a schematic partial structural view of three neighboring wires in FIG. 6.

FIG. 6 is a schematic structural top view of a fan-out area according to a second embodiment of the present invention, and FIG. 7 is a schematic partial structural view of three neighboring wires in FIG. 6. Please refer to FIGS. 6 and 7 together:

The fan-out area 60 in the second embodiment will be described on the basis of the first embodiment illustrated in FIGS. 4 and 5, a difference is that: in the fan-out area 60 of this embodiment, along each of the directions toward the middle wire 61, lengths of second sub-patterns 632 of different wires are successively decreased while widths of the second sub-patterns 632 of the different wires are kept unchanged, and lengths of first sub-patterns 631 of the different wires are the same. Preferably, the lengths of the second sub-patterns 632 of the different wires are successively decreased with a second amplitude. The above-mentioned first amplitude and the second amplitude are without necessarily mathematical relationship, and thus can be the same or different from each other.

Likewise, by combining the expressions 1-13 through 1-16 ought to be satisfied by the width $\Delta s$ and the length $\Delta h$ of the arcuate patterns in the prior art as described above with a route (rather than length) of the second wire pattern 64 and the turning part 65 of each wire in the fan-out 60 according to the second embodiment being the same as that in the prior art, it can be obtained that: in each wire, the length of each the first sub-pattern 631 and the length of each the second sub-pattern 632 ought to satisfy the following expressions:

$$\Delta s = l' - d_{1'} \quad \text{(Expression 1-20)}$$

$$\frac{\Delta L_n}{\Delta s} = N \quad \text{(Expression 1-21)}$$

$$N\Delta h_n \le h_1 \quad \text{(Expression 1-22)}$$

Where, $\Delta s$ is the width of each the first wire pattern 63 of each wire in the fan-out area 60; $d_1$ is a distance between two neighboring wires in the fan-out area 60, i.e., a distance between the first wire patterns 63 of the two neighboring wires; $\Delta h_n$ is a length of the second sub-pattern 632 of a nth wire.

Compared with the prior art, this embodiment keeps the positions of the whole fan-out area 60 and the display area of the liquid crystal display panel unchanged, keeps the widths $\Delta s$ of the arcuate patterns of the wires to be the same, and successively decreases the lengths $\Delta h_n$ of the arcuate patterns of the wires, which makes the length $\Delta h_n$ of each the arcuate pattern corresponding to the wire with a minimum resistance (i.e., middle wire 61) be the minimum. Since the height of the fan-out area 60 is unchanged, the decrease of the length $\Delta h_n$ would necessarily increase the number of transverses (i.e., the number of the first sub-patterns 631) of the arcuate patterns. Compared with the prior art with unchanged length of arcuate pattern, the second embodiment more easily satisfies the above expressions 1-20 through 1-22 to get the solution of N. That is, the scheme of the arcuate patterns of the wires having the same width and successively decreased lengths is very easily to reduce even eliminate the length differences among the wires, and thereby the resistance differences among the wires in the fan-out area 60 are reduced.

Further, as to each wire, the second embodiment makes the length of the wire along a direction perpendicular to the display area to be greatly reduced with respect to the prior art while successively decreases the lengths of the arcuate patterns and increases the number of the first sub-patterns 631, which is extremely beneficial to the narrow border design of the liquid crystal display panel.

Figure 8:
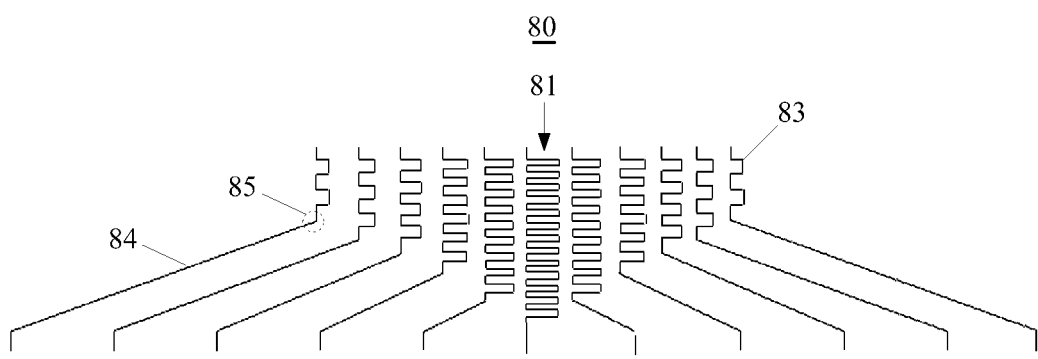
FIG. 8 is a schematic structural top view of a fan-out area of a third embodiment of the present invention.
Figure 9:
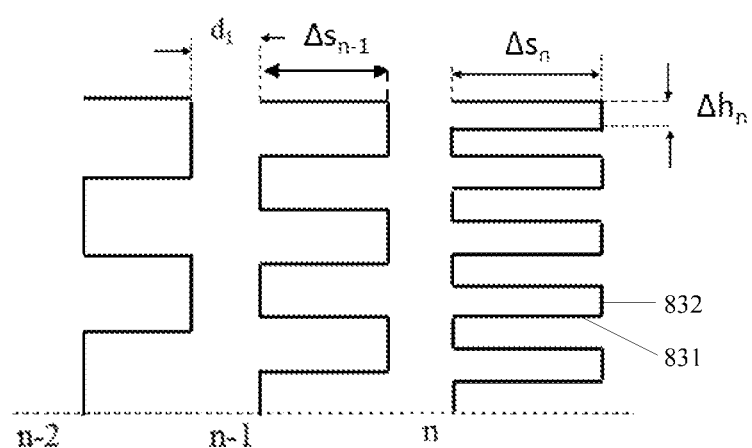
FIG. 9 is a schematic partial structural view of three neighboring wires in FIG. 8.

FIG. 8 is a schematic structural top view of a fan-out area according to a third embodiment of the present invention, and FIG. 9 is a schematic partial structural view of three neighboring wires in FIG. 8. Please refer to FIGS. 8 and 9 together:

A fan-out area 80 in this embodiment will be described on the basis of the first embodiment as illustrated in FIGS. 4 and 5, and a difference is that: in the fan-out area 80 of this embodiment, along each of the directions toward the middle wire 81, lengths of second sub-patterns 832 of different wires are successively decreased and widths of the second sub-patterns 832 of the different wires are kept unchanged, and the lengths of the first sub-patterns 831 of the different wires are successively increased.

Likewise, by combining the expressions 1-13 through 1-16 ought to be satisfied by the width $\Delta s$ and the length $\Delta h$ of the arcuate patterns in the prior art with a route (rather than length) of the second wire pattern 84 and the turning part 85 of each wire in the fan-out area 80 according to the third embodiment being the same as that in the prior art, it can be obtained that, in each wire, the length of each the first sub-pattern 831 and the length of each the second sub-pattern 832 ought to satisfy the following expressions:

$$0 \leq \Delta s_1 < \Delta s_2 \ldots < \Delta s_n \leq l' - d_{1'} \quad \text{(Expression 1-24)}$$

$$\frac{\Delta L_n}{\Delta s_n} = N \quad \text{(Expression 1-25)}$$

$$N \Delta h_n \leq h_1 \quad \text{(Expression 1-26)}$$

Where, $\Delta s_1, \Delta s_2, \ldots, \Delta s_n$ respectively are the widths of the first wire patterns 83 of the first wire, the second wire, ..., the nth wire; $d_1$ is a distance between two neighboring wires in the fan-out area 80, i.e., a distance between the first wire patterns 83 of the two neighboring wires; $\Delta h_n$ is the length of each the second sub-pattern 832 of the nth wire.

Compared with the prior art, the third embodiment keeps the positions of the whole fan-out area 80 and the display area of liquid crystal display panel unchanged, successively increases the widths of the arcuate patterns of the different wires and successively decreases the lengths of the arcuate patterns of the different wires, which makes the length $\Delta h_n$ and the width $\Delta s_n$ corresponding to each the arcuate pattern of the wire with a minimum resistance (i.e., the middle wire 81) respectively are minimum and maximum, and further since the height of the fan-out area 80 is unchanged, the decrease of lengths would necessarily increase the number of transverses (i.e., the number of first sub-patterns 831) of the arcuate patterns, in combination with the widths of the arcuate patterns of the different wires being successively increased, compared with the prior art, the third embodiment more easily satisfies all the above expressions 1-23 through 1-25 to get a solution of N. That is, the scheme of the arcuate patterns of the wires having successively increased widths and successively decreased lengths is more easily to reduce even eliminate the length differences among the wires, and thereby the resistance differences among the wires in the fan-out area 80 would be reduced.

Furthermore, as to each wire, the third embodiment makes the length of the wire along a direction perpendicular to the display area to be greatly reduced with respect to the prior art while successively decreases the lengths of the arcuate patterns of different wires to increase the number of the first sub-patterns 631 and successively increases the widths of the arcuate patterns, which is extremely beneficial to the narrow border design of the liquid crystal display panel.

In summary, the embodiments of the present invention each design the first wire patterns of different wires in the fan-out area to be with successively increased widths and/or successively decreased lengths along each of the directions toward the middle wire while the first wire patterns of a same wire to be with a same width and a same length, so as to reduce the length differences among the wires in the fan-out area, the resistance differences among the wires can be reduced, and the phenomenon of color washout and non-uniform brightness caused by the resistance differences can be relieved or avoided. Moreover, the decrease of the length differences among the wires in the fan-out area can reduce the area of the fan-out area with respect to the prior art, which is beneficial to the narrow border design of the liquid crystal display panel.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fan-out area adapted for being arranged in a peripheral circuit area of a liquid crystal display panel, the fan-out area comprising a plurality of wires, the plurality of wires comprising a middle wire and a plurality of fan-out wires arranged at two sides of the middle wire, wherein:
    the middle wire and the plurality of fan-out wires each are disposed with at least one first wire pattern; along each of directions toward the middle wire, lengths of the first wire patterns of different wires of the plurality of wires are successively decreased, the first wire patterns of a same one of the different wires have a same width and a same length;
    a distance between any two neighboring wires of the plurality of wires is equal to a distance between another two neighboring wires of the plurality of wires, the plurality of fan-out wires are symmetrically arranged at the two sides of the middle wire, the first wire pattern comprises first sub-patterns and a second sub-pattern, the first sub-patterns and the second sub-pattern being alternately perpendicularly connected with one another in head-to-tail manner, a length of each the first sub-pattern being the width of the first wire pattern, and a length of the second sub-pattern being the length of the first wire pattern;

wherein along each of the directions toward the middle wire, the lengths of the second sub-patterns of the different wires are successively decreased and the lengths of the first sub-patterns of the different wires are the same, or the lengths of the first sub-patterns of the different wires are successively increased and the lengths of the second sub-patterns of the different wires are successively decreased.

2. The fan-out area as claimed in claim 1, wherein the fan-out area further comprises turning parts and second wire patterns, each turning part connects corresponding first wire pattern with corresponding second wire pattern, connection points of the turning parts and the second wire patterns at a same side of the middle wire are on a same imaginary straight line.

3. A fan-out area adapted for being arranged in a peripheral circuit area of a liquid crystal display panel, the fan-out area comprising a plurality of wires, the plurality of wires comprising a middle wire and a plurality of fan-out wires arranged at two sides of the middle wire; wherein:

the middle wire and the plurality of fan-out wires each are disposed with at least one first wire pattern; along each of directions toward the middle wire, lengths of the first wire patterns of different wires of the plurality of wires are successively decreased, the first wire patterns of a same one of the different wires have a same width and a same length;

wherein the first wire pattern comprises first sub-patterns and a second sub-pattern, the first sub-patterns and the second sub-pattern being alternately perpendicularly connected with one another in head-to-tail manner, a length of each the first sub-pattern being the width of the first wire pattern, and a length of the second sub-pattern being the length of the first wire pattern;

wherein along each of the directions toward the middle wire, the lengths of the second sub-patterns of the different wires are successively decreased and the lengths of the first sub-patterns of the different wires are the same, or the lengths of the first sub-patterns of the different wires are successively increased and the lengths of the second sub-patterns of the different wires are successively decreased.

4. The fan-out area as claimed in claim 3, wherein the fan-out area further comprises turning parts and second wire patterns, each turning part connects corresponding first wire pattern with corresponding second wire pattern, connection points of the turning parts and the second wire patterns at each side of the middle wire are on a same imaginary straight line.

5. The fan-out area as claimed in claim 4, wherein widths of the first sub-patterns and widths of the second sub-patterns of the middle wire and the plurality of fan-out wire are the same, and further are the same as widths of the second wire patterns.

6. The fan-out area as claimed in claim 3, wherein a distance between any two neighboring wires of the plurality of wires is equal to a distance between another two neighboring wires of the plurality of wires.

7. The fan-out area as claimed in claim 6, wherein the plurality of fan-out wires are symmetrically disposed at the two sides of the middle wire.

8. A liquid crystal display panel, a peripheral circuit area of the liquid crystal display panel having a fan-out area, the fan-out area comprising a plurality of wires, the plurality of wires comprising a middle wire and a plurality of fan-out wires arranged at two sides of the middle, wherein:

the middle wire and the plurality of fan-out wires each are disposed with at least one first wire pattern; along each of directions toward the middle wire, lengths of the first wire patterns of different wires of the plurality of wires are successively decreased, the first wire patterns of a same one of the different wires have a same width and a same length;

wherein the first wire pattern comprises first sub-patterns and a second sub-pattern, the first sub-patterns and the second sub-pattern being alternately perpendicularly connected with one another in head-to-tail manner, a length of each the first sub-pattern being the width of the first wire pattern, and a length of the second sub-pattern being the length of the first wire pattern;

wherein along each of the directions toward the middle wire, the lengths of the second sub-patterns of the different wires are successively decreased and the lengths of the first sub-patterns of the different wires are the same, or the lengths of the first sub-patterns of the different wires are successively increased and the lengths of the second sub-patterns of the different wires are successively decreased.

9. The liquid crystal display panel as claimed in claim 8, wherein the fan-out area further comprises turning parts and second wire patterns, each turning part connects corresponding first wire pattern with corresponding second wire pattern, connection points of the turning parts and the second wire patterns at each side of the middle wire are on a same imaginary straight line.

* * * * *